US010814427B2

(12) United States Patent
Ostroverkhov et al.

(10) Patent No.: US 10,814,427 B2
(45) Date of Patent: Oct. 27, 2020

(54) SYSTEMS AND METHODS FOR ADDITIVE MANUFACTURING IN-BUILD ASSESSMENT AND CORRECTION OF LASER POINTING ACCURACY

(71) Applicant: General Electric Company, Schenectady, NY (US)

(72) Inventors: Victor Petrovich Ostroverkhov, Ballston Lake, NY (US); Harry Kirk Mathews, Jr., Clifton Park, NY (US); Justin John Gambone, Jr., Watervliet, NY (US); Jason Harris Karp, Niskayuna, NY (US); Kevin George Harding, Niskayuna, NY (US); Scott Michael Miller, Clifton Park, NY (US); William Thomas Carter, Galway, NY (US)

(73) Assignee: General Electric Company, Schenectady, NY (US)

( * ) Notice: Subject to any disclaimer, the term of this patent is extended or adjusted under 35 U.S.C. 154(b) by 291 days.

(21) Appl. No.: 15/867,104

(22) Filed: Jan. 10, 2018

(65) Prior Publication Data

US 2018/0193956 A1 Jul. 12, 2018

Related U.S. Application Data

(60) Provisional application No. 62/445,046, filed on Jan. 11, 2017.

(51) Int. Cl.
| | | |
|---|---|---|
| *B23K 26/342* | (2014.01) | |
| *G01B 11/27* | (2006.01) | |
| *B33Y 30/00* | (2015.01) | |
| *B23K 26/082* | (2014.01) | |
| *B23K 26/03* | (2006.01) | |

(Continued)

(52) U.S. Cl.
CPC .......... *B23K 26/342* (2015.10); *B23K 26/032* (2013.01); *B23K 26/042* (2015.10);
(Continued)

(58) Field of Classification Search
CPC .. B23K 26/342; B23K 26/042; B23K 26/082; B23K 26/032; B33Y 30/00; B33Y 50/02;
(Continued)

(56) References Cited

U.S. PATENT DOCUMENTS

| 9,114,478 B2 | 8/2015 | Scott et al. |
|---|---|---|
| 2012/0074107 A1 | 3/2012 | Berthe et al. |

(Continued)

FOREIGN PATENT DOCUMENTS

| WO | 00/21475 A1 | 4/2000 |
|---|---|---|
| WO | 2016/079496 A2 | 5/2016 |

OTHER PUBLICATIONS

Stefan et al., "Error Detection in Laser Beam Melting Systems by High Resolution Imaging", Proceedings of the Twenty Third Annual International Solid Freeform Fabrication Symposium, Aug. 2012.

(Continued)

*Primary Examiner* — Janie M Loeppke
(74) *Attorney, Agent, or Firm* — Armstrong Teasdale LLP

(57) ABSTRACT

An additive manufacturing system includes a laser device, a build plate, a first scanning device, and an alignment system. The laser device is configured to generate a laser beam. The build plate has a position relative to the laser device. The first scanning device is configured to selectively direct the laser beam across the build plate. The laser beam generates a melt pool on the build plate. The alignment system includes a fiducial marks projector configured to project a plurality of fiducial marks across the build plate. Each fiducial mark has a location on the build plate. The alignment system also includes an optical detector configured to detect the location of each of the fiducial marks on the build plate. The alignment system is configured to detect the position of the build plate relative to the laser device.

18 Claims, 8 Drawing Sheets

(51) Int. Cl.
*B23K 26/042* (2014.01)
*B33Y 50/02* (2015.01)
*G01B 11/00* (2006.01)
*B22F 3/105* (2006.01)

(52) U.S. Cl.
CPC ............ *B23K 26/082* (2015.10); *B33Y 30/00* (2014.12); *B33Y 50/02* (2014.12); *G01B 11/002* (2013.01); *G01B 11/272* (2013.01); *B22F 2003/1056* (2013.01); *B22F 2003/1057* (2013.01)

(58) Field of Classification Search
CPC ..... B22F 2003/1056; B22F 2003/1057; G01B 11/002; G01B 11/272
See application file for complete search history.

(56) References Cited

U.S. PATENT DOCUMENTS

| | | |
|---|---|---|
| 2015/0100149 A1 | 4/2015 | Coeck et al. |
| 2015/0165683 A1 | 6/2015 | Cheverton et al. |
| 2015/0177158 A1 | 6/2015 | Cheverton |
| 2015/0273767 A1 | 10/2015 | Batchelder et al. |
| 2015/0352664 A1 | 12/2015 | Errico et al. |
| 2016/0037144 A1* | 2/2016 | Schultz .................. G03B 21/28 348/745 |
| 2016/0147214 A1 | 5/2016 | Lu et al. |
| 2016/0175935 A1 | 6/2016 | Ladewig et al. |
| 2016/0236279 A1 | 8/2016 | Ashton et al. |

OTHER PUBLICATIONS

G Spears et al., "In-process sensing in selective laser melting (SLM) additive manufacturing", Integrating Materials and Manufacturing Innovation, vol. 05, Issue: 02, Dec. 2016.

International Search Report and Written Opinion issued in connection with corresponding PCT Application No. PCT/US2018/013352 dated Apr. 18, 2018.

* cited by examiner

SYSTEMS AND METHODS FOR ADDITIVE MANUFACTURING IN-BUILD ASSESSMENT AND CORRECTION OF LASER POINTING ACCURACY

CROSS REFERENCE TO RELATED APPLICATIONS

This application claims priority to U.S. provisional patent application Ser. No. 62/445,046, filed Jan. 11, 2017, which is hereby incorporated by reference in its entirety.

BACKGROUND

The field of the disclosure relates generally to additive manufacturing systems, and more particularly, to systems and methods for aligning a build plate with a DMLM system.

At least some additive manufacturing systems involve the buildup of a powdered material to make a component. This method can produce complex components from expensive materials at a reduced cost and with improved manufacturing efficiency. At least some known additive manufacturing systems, such as Direct Metal Laser Melting (DMLM) systems, fabricate components using a laser device, a build plate, and a powder material, such as, without limitation, a powdered metal. The laser device generates a laser beam that melts the powder material on the build plate in and around the area where the laser beam is incident on the powder material, resulting in a melt pool. Some known components may require different laser temperatures and different powder materials for different parts of the components. Additionally, some known DMLM processes may build onto existing parts. As such, some known components may require multiple DMLM systems to complete the component. Transferring the unfinished component from a first DMLM system to a second DMLM system, can decrease the build time of the component. However, misalignment of the component in the second DMLM system can occur if the build plate is not properly aligned in the second DMLM system.

BRIEF DESCRIPTION

In one aspect, an additive manufacturing system is provided. The additive manufacturing system includes a laser device, a build plate, a first scanning device, and an alignment system. The laser device is configured to generate a laser beam. The build plate has a position relative to the laser device. The first scanning device is configured to selectively direct the laser beam across the build plate. The laser beam generates a melt pool on the build plate. The alignment system includes a fiducial marks projector configured to project a plurality of fiducial marks across the build plate. Each fiducial mark has a location on the build plate. The alignment system also includes an optical detector configured to detect the location of each of the fiducial marks on the build plate. The alignment system is configured to detect the position of the build plate relative to the laser device.

In another aspect, an additive manufacturing system is provided. The additive manufacturing system includes a laser device, a build plate, a first scanning device, and an alignment system. The laser device is configured to generate a laser beam. The build plate has a position relative to the laser device and includes a plurality of fiducial marks disposed on a top side of the build plate. Each fiducial mark has a location on the build plate. The first scanning device is configured to selectively direct the laser beam across the build plate. The laser beam generates a melt pool on the build plate. The alignment system includes an optical detector configured to detect the location of each of the fiducial marks on the build plate. The alignment system is configured to detect the position of the build plate relative to the laser device.

In yet another aspect, an additive manufacturing system is provided. The additive manufacturing system includes a laser device, a build plate, a first scanning device, and an alignment system. The laser device is configured to generate a laser beam. The build plate has a position relative to the laser device and includes a plurality of fiducial marks disposed on a bottom side of the build plate. Each fiducial mark has a location on the build plate. The first scanning device is configured to selectively direct the laser beam across the build plate. The laser beam generates a melt pool on the build plate. The alignment system includes an optical detector configured to detect the location of each of the fiducial marks on the build plate. The alignment system is configured to detect the position of the build plate relative to the laser device.

In a further aspect, an additive manufacturing system is provided. The additive manufacturing system includes a laser device, a mobile build plate unit, a first scanning device, and an alignment system. The laser device is configured to generate a laser beam. The mobile build plate unit includes a build plate and an optical detector. The build plate has a position relative to the laser device. The first scanning device is configured to selectively direct the laser beam across a build plate. The laser beam generates a melt pool on the build plate. The alignment system includes a fiducial marks projector configured to project a plurality of fiducial marks across the build plate. Each fiducial mark has a location on the build plate. The optical detector is configured to detect the location of each of the fiducial marks on the build plate. The alignment system is configured to detect the position of the build plate relative to the laser device.

DRAWINGS

These and other features, aspects, and advantages of the present disclosure will become better understood when the following detailed description is read with reference to the accompanying drawings in which like characters represent like parts throughout the drawings, wherein.

Figure 1:
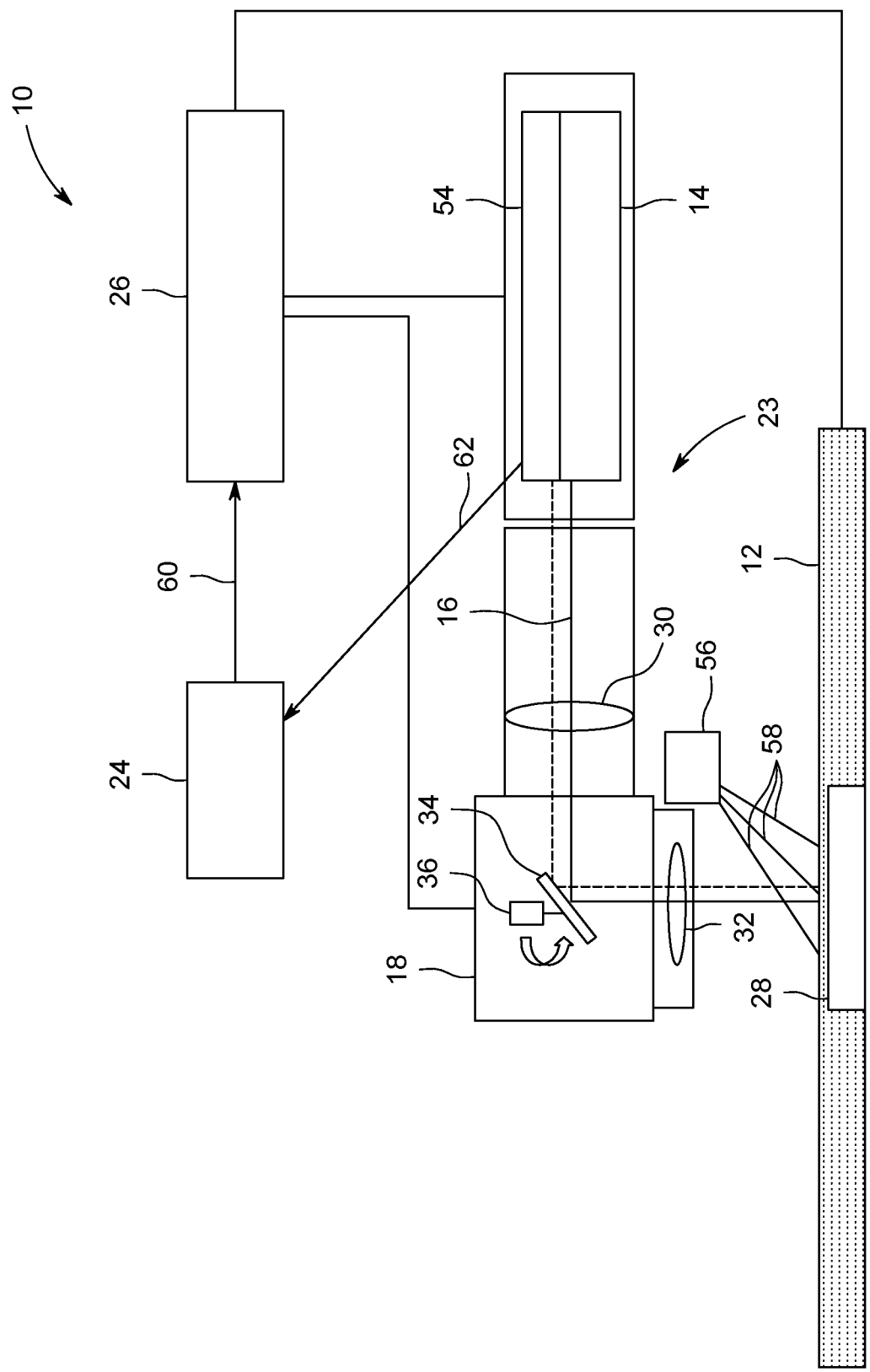
FIG. 1 is a schematic view of an exemplary additive manufacturing system shown in the form of a direct metal laser melting (DMLM) system including an alignment system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable nonvolatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the additive manufacturing systems with an alignment system described herein align a build plate with a direct metal laser melting (DMLM) system. The additive manufacturing system includes an alignment system including an optical detector and a plurality of fiducial marks on the build plate. In one embodiment, the fiducial marks are projected onto the build plate and the optical detector observers the fiducial marks coincident with the laser beam through a galvanometer. In another embodiment, the fiducial marks are coupled to the top of the build plate and the optical detector observers the fiducial marks independent of the laser beam. In yet another embodiment, the fiducial marks are coupled to the bottom of the build plate and the optical detector observers the fiducial marks from below the build plate. In yet another embodiment, the fiducial marks are projected onto the build plate and the optical detector is permanently coupled to the build plate. During operations, the build plate is moved to multiple DMLM systems during the course of building a single component. The optical detector observes the fiducial marks on the build plate and detects the position of the build plate relative to the DMLM system. The alignment system within each DMLM system aligns the build plate with the DMLM system based on the position of the build plate. Aligning the build plate with different DMLM systems allows the component to be built on multiple DMLM systems, thereby decreasing build time.

FIG. 1 is a schematic view of an exemplary additive manufacturing system 10 illustrated in the form of a direct metal laser melting (DMLM) system. Although the embodiments herein are described with reference to a DMLM system, this disclosure may also apply to other types of additive manufacturing systems, such as selective laser sintering systems.

In the exemplary embodiment, DMLM system 10 includes a build plate 12, a laser device 14 configured to generate a laser beam 16, a first scanning device 18 configured to selectively direct laser beam 16 across build plate 12, and an alignment system 23. The exemplary DMLM system 10 also includes a computing device 24 and a controller 26 configured to control one or more components of DMLM system 10, as described in more detail herein.

Build plate 12 includes a powdered build material that is melted and re-solidified during the additive manufacturing process to build a solid component 28. The powdered build material includes materials suitable for forming such components, including, without limitation, gas atomized alloys of cobalt, iron, aluminum, titanium, nickel, and combinations thereof. In other embodiments, the powdered build material may include any suitable type of powdered metal material. In yet other embodiments, the powdered build material may include any suitable build material that enables DMLM system 10 to function as described, including, for example and without limitation, ceramic powders, metal-coated ceramic powders, and thermoset or thermoplastic resins.

Laser device 14 is configured to generate a laser beam 16 of sufficient energy to at least partially melt the build material of build plate 12. In the exemplary embodiment, laser device 14 is a yttrium-based solid state laser configured to emit a laser beam having a wavelength of about 1070 nanometers (nm). In other embodiments, laser device 14 may include any suitable type of laser that enables DMLM system 10 to function as described herein, such as a $CO_2$ laser. Further, although DMLM system 10 is shown and described as including a single laser device 14, DMLM system 10 may include more than one laser device. In one embodiment, for example, DMLM system 10 may include a first laser device having a first power and a second laser device having a second power different from the first laser power, or at least two laser devices having substantially the same power output. In yet other embodiments, DMLM system 10 may include any combination of laser devices that enable DMLM system 10 to function as described herein.

As shown in FIG. 1, laser device 14 is optically coupled to optical elements 30 and 32 that facilitate focusing laser beam 16 on build plate 12. In the exemplary embodiment, optical elements 30 and 32 include a beam collimator 30 disposed between the laser device 14 and first scanning device 18, and an F-theta lens 32 disposed between the first scanning device 18 and build plate 12. In other embodiments, DMLM system 10 may include any suitable type and arrangement of optical elements that provide a collimated and/or focused laser beam on build plate 12.

First scanning device 18 is configured to direct laser beam 16 across selective portions of build plate 12 to create solid component 28. In the exemplary embodiment, first scanning device 18 is a galvanometer scanning device including a mirror 34 operatively coupled to a galvanometer-controlled motor 36 (broadly, an actuator). Motor 36 is configured to move (specifically, rotate) mirror 34 in response to signals received from controller 26, and thereby deflect laser beam 16 across selective portions of build plate 12. Mirror 34 may have any suitable configuration that enables mirror 34 to deflect laser beam 16 towards build plate 12. In some embodiments, mirror 34 may include a reflective coating that has a reflectance spectrum that corresponds to the wavelength of laser beam 16.

Although first scanning device 18 is illustrated with a single mirror 34 and a single motor 36, first scanning device 18 may include any suitable number of mirrors and motors that enable first scanning device 18 to function as described herein. In one embodiment, for example, first scanning device 18 includes two mirrors and two galvanometer-controlled motors, each operatively coupled to one of the mirrors. In yet other embodiments, first scanning device 18 may include any suitable scanning device that enables DMLM system 10 to function as described herein, such as, for example, two-dimension (2D) scan galvanometers, three-dimension (3D) scan galvanometers, and dynamic focusing galvanometers.

Build plate 12 is configured to operate with multiple DMLM systems 10. In the exemplary embodiment, a first DMLM system 10 manufactures a first part of solid component 28 and a second DMLM system 10 manufactures a second part of solid component 28. Build plate 12 is moved from first DMLM system 10 to second DMLM system 10 with solid component 28 on build plate 12. Build plate 12 must be aligned with second DMLM system 10.

Alignment system 23 is configured to align build plate 12 with DMLM system 10. Alignment system 23 includes a second optical detector 54 and a fiducial marks projector 56. Fiducial marks projector 56 projects a plurality of fiducial marks 58 on build plate 12. In the exemplary embodiment, fiducial marks projector 56 projects three fiducial marks 58. However, fiducial marks projector 56 may project any number of fiducial marks 58 which enables alignment system 23 to operate as described herein. Each fiducial mark 58 includes a shape projected onto build plate 12 by fiducial marks projector 56. Fiducial marks projector 56 includes a plurality of lasers (not shown) which project fiducial marks 58 onto build plate 12.

Figure 2:
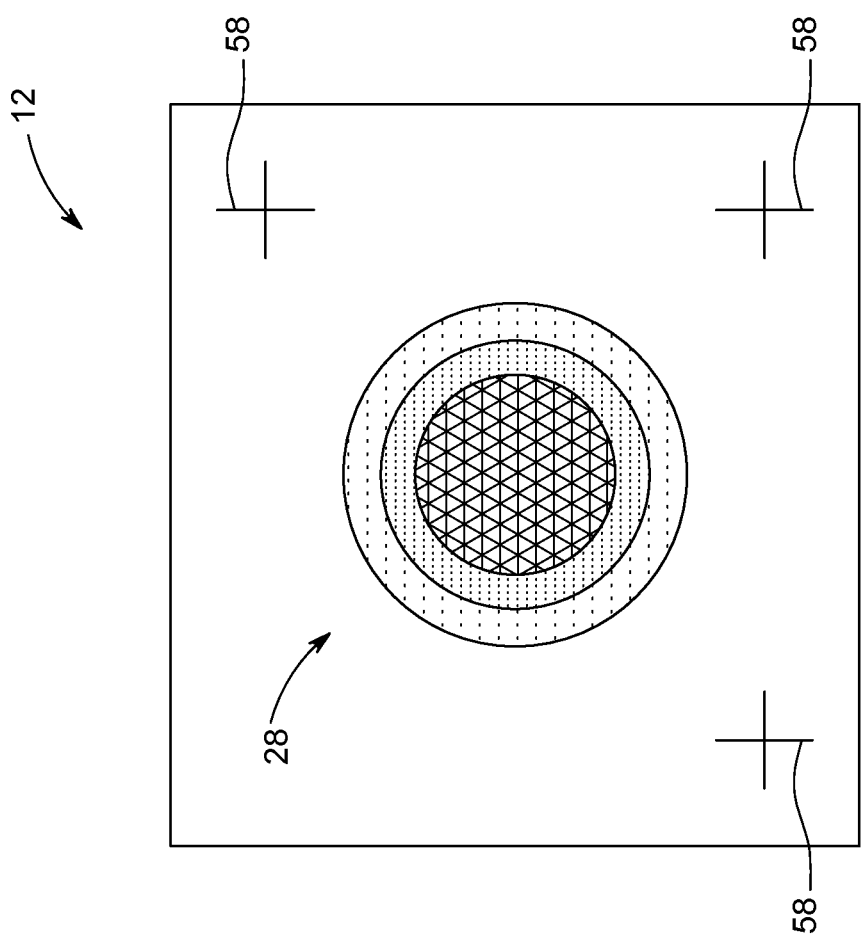
FIG. 2 is a schematic view of an build plate of the additive manufacturing system of FIG. 1.

FIG. 2 is a schematic view of build plate 12 of DMLM system 10. In the exemplary embodiment, build plate 12 has a rectangular shape. In other embodiments, build plate 12 may have any suitable size and shape that enables DMLM system 10 to function as described herein. Fiducial marks 58 are projected onto build plate 12. In the exemplary embodiment, fiducial marks 58 have a cross shape. In other embodiments, the shape of fiducial marks 58 may include a circle shape, a triangle shape, or any shape which enables alignment system 23 to operate as described herein. Additionally, fiducial marks 58 may include a grid pattern, a pattern of dots, a checkerboard pattern, or any other pattern which enables alignment system 23 to operate as described herein. Fiducial marks 58 are moveable along build plate 12. More specifically, the position of fiducial marks 58 can be adjusted using fiducial marks projector 56. Additionally, the size and shape of fiducial marks projector 56 may be adjusted using fiducial marks projector 56. Additionally, fiducial marks 58 may be projected outside of build plate 12 but within a build chamber.

As shown in FIG. 1, second optical detector 54 is configured to detect the position of fiducial marks 58 on build plate 12, and generate an electrical signal 62 in response thereto. Second optical detector 54 is configured to detect the position of fiducial marks 58 on build plate 12 through first scanning device 18 while fiducial marks projector 56 does not project fiducial marks 58 through first scanning device 18. Second optical detector 54 is aligned with laser beam 16. Thus, second optical detector 54 detects the position of build plate 12 relative to DMLM system 10. Second optical detector 54 is communicatively coupled to computing device 24, and is configured to transmit electrical signal 62 to computing device 24. Computing device 24 generates a control signal 60 to controller 26 which controls the alignment of build plate 12 within DMLM system 10, the alignment of first scanning device 18, and alignment of mirror 34. Controller 26 aligns build plate in response to the position of fiducial marks 58 by changing the position of build plate 12, first scanning device 18, and mirror 34. Thus, build plate 12 is capable of moving to, and alignment within, different DMLM systems 10.

In another embodiment, the positions of second optical detector 54 and fiducial marks projector 56 are exchanged. That is, second optical detector 54 occupies the position of fiducial marks projector 56 and fiducial marks projector 56 occupies the position of second optical detector 54. Fiducial marks projector 56 projects fiducial marks 58 through first scanning device 18 while second optical detector 54 does not detect fiducial marks 58 through first scanning device 18. Fiducial marks 58 are aligned with laser beam 16. Thus, second optical detector 54 detects the position of fiducial marks 58 relative to laser beam 16 and DMLM system 10. Second optical detector 54 is communicatively coupled to computing device 24, and is configured to transmit electrical signal 62 to computing device 24. Computing device 24 generates a control signal 60 to controller 26 which controls the alignment of build plate 12 within DMLM system 10, the alignment of first scanning device 18, and alignment of mirror 34. Controller 26 aligns build plate in response to the position of fiducial marks 58 by changing the position of build plate 12, first scanning device 18, and mirror 34. Thus, build plate 12 is capable of moving to, and alignment within, different DMLM systems 10.

Computing device 24 may be a computer system that includes at least one processor (not shown in FIG. 1) that executes executable instructions to operate DMLM system 10. Computing device 24 may include, for example, a calibration model of DMLM system 10 and an electronic computer build file associated with a component, such as component 28. The calibration model may include, without limitation, an expected or desired melt pool size and temperature under a given set of operating conditions (e.g., a power of laser device 14) of DMLM system 10. The build file may include build parameters that are used to control one or more components of DMLM system 10. Build parameters may include, without limitation, a power of laser device 14, a scan speed of first scanning device 18, and a position and orientation of first scanning device 18 (specifically, mirror 34). In the exemplary embodiment, computing device 24 and controller 26 are shown as separate devices. In other embodiments, computing device 24 and controller 26 may be combined as a single device that operates as both computing device 24 and controller 26 as each are described herein.

Controller 26 may include any suitable type of controller that enables DMLM system 10 to function as described herein. In one embodiment, for example, controller 26 is a computer system that includes at least one processor and at least one memory device that executes executable instructions to control the operation of DMLM system 10 based at least partially on instructions from human operators. Controller 26 may include, for example, a 3D model of component 28 to be fabricated by DMLM system 10. Executable instructions executed by controller 26 may include controlling the power output of laser device 14, controlling a position and scan speed of first scanning device 18, and controlling a position and scan speed of second scanning device 42.

Controller 26 is configured to control one or more components of DMLM system 10 based on build parameters associated with a build file stored, for example, within computing device 24. In the exemplary embodiment, controller 26 is configured to control first scanning device 18 based on a build file associated with a component to be fabricated with DMLM system 10. More specifically, controller 26 is configured to control the position, movement, and scan speed of mirror 34 using motor 36 based upon a predetermined path defined by a build file associated with component 28.

Controller 26 may also be configured to control other components of DMLM system 10, including, without limitation, laser device 14. In one embodiment, for example, controller 26 controls the power output of laser device 14 based on build parameters associated with a build file.

Figure 3:
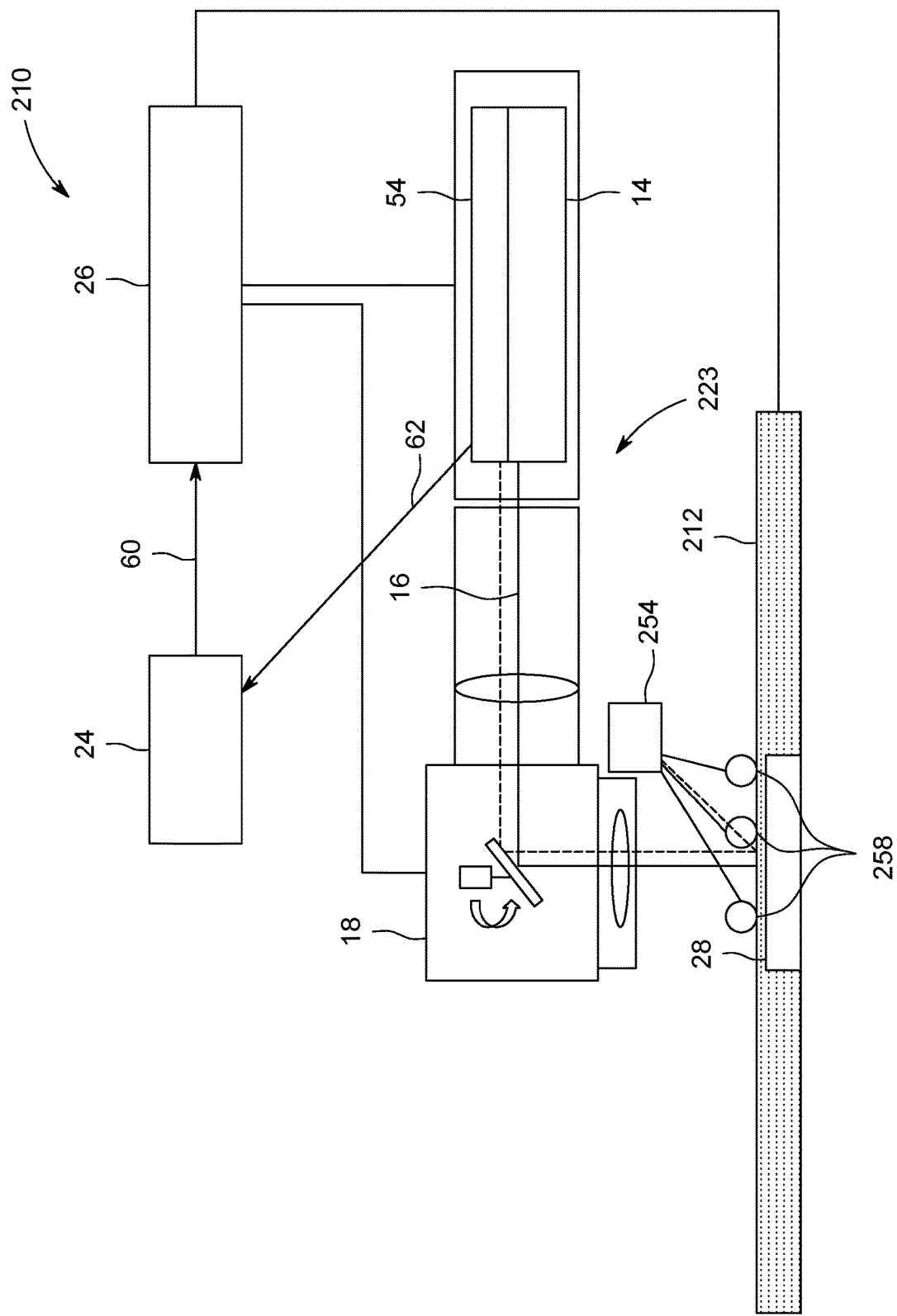
FIG. 3 is a schematic view of an exemplary additive manufacturing system shown in the form of a direct metal laser melting (DMLM) system including an alignment system.

FIG. 3 is a schematic view of an exemplary additive manufacturing system 210 with another embodiment of an alignment system 223 illustrated in the form of a direct metal laser melting (DMLM) system. Although the embodiments herein are described with reference to a DMLM system, this disclosure may also apply to other types of additive manufacturing systems, such as selective laser sintering systems. Common components between DMLM system 10 and DMLM system 210 have the same numbers. Unless otherwise indicated, components of DMLM system 210 are substantially similar to components of DMLM system 10 (shown in FIG. 1).

In the exemplary embodiment, DMLM system 210 includes a build plate 212, a laser device 14 configured to generate a laser beam 16, a first scanning device 18 configured to selectively direct laser beam 16 across build plate 212, and an alignment system 223. The exemplary DMLM system 210 also includes a computing device 24 and a controller 26 configured to control one or more components of DMLM system 210, as described in more detail herein.

Build plate 212 is configured to operate with multiple DMLM systems 10. In the exemplary embodiment, a first DMLM system 210 manufactures a first part of solid component 28 and a second DMLM system 210 manufactures a second part of solid component 28. Build plate 212 is moved from first DMLM system 210 to second DMLM system 210 with solid component 28 on build plate 212. Build plate 212 must be aligned with second DMLM system 210.

Alignment system 223 is configured to align build plate 212 with DMLM system 210. Alignment system 223 includes a second optical detector 54 and a plurality of fiducial marks 258 on build plate 212. In the exemplary embodiment, build plate 212 includes three fiducial marks 258. However, build plate 212 may include any number of fiducial marks 258 which enable alignment system 223 to operate as described herein.

Figure 4:
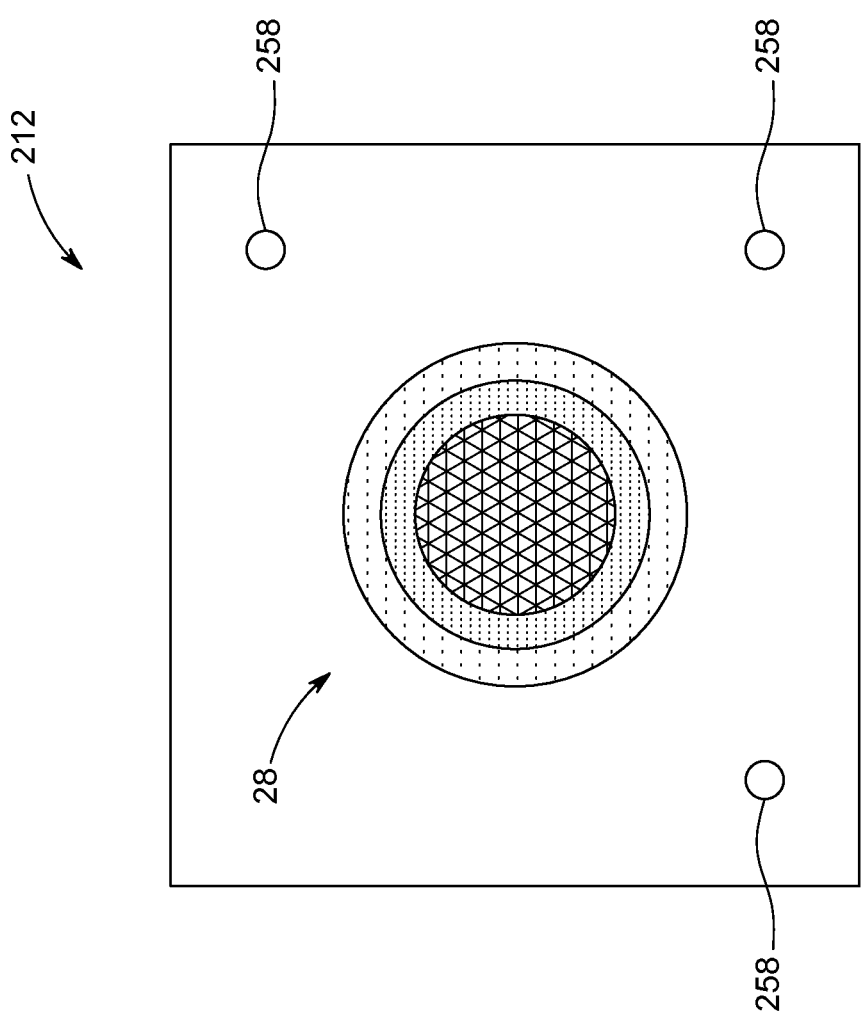
FIG. 4 is a schematic view of an build plate of the additive manufacturing system of FIG. 3.

FIG. 4 is a schematic view of build plate 212 of DMLM system 210. In the exemplary embodiment, build plate 212 has a rectangular shape. In other embodiments, build plate 212 may have any suitable size and shape that enables DMLM system 210 to function as described herein. Fiducial marks 258 are permanently coupled to build plate 212. In the exemplary embodiment, fiducial marks 258 have a sphere shape. In other embodiments, the shape of fiducial marks 258 may include a cross shape, a pyramid shape, or any shape which enables alignment system 223 to operate as described herein. Additionally, fiducial marks 258 may include a grid pattern, a pattern of dots, a checkerboard pattern, or any other pattern which enables alignment system 223 to operate as described herein. In the exemplary embodiment, fiducial marks 258 are located outside of a build area within build plate 212.

As shown in FIG. 3, second optical detector 54 is configured to detect the position of fiducial marks 258 on build plate 212, and generate an electrical signal 62 in response thereto. Second optical detector 54 is configured to detect the position of fiducial marks 258 on build plate 212 through first scanning device 18. Second optical detector 54 is aligned with laser beam 16. Thus, second optical detector 54 detects the position of build plate 212 relative to DMLM system 210. Second optical detector 54 is communicatively coupled to computing device 24, and is configured to transmit electrical signal 62 to computing device 24. Computing device 24 generates a control signals 60 to controller 26 which controls the alignment of build plate 212 within DMLM system 210, the alignment of first scanning device 18, and alignment of mirror 34. Controller 26 aligns build plate in response to the position of fiducial marks 258 by changing the position of build plate 212, first scanning device 18, and mirror 34. Thus, build plate 212 is capable of moving to, and alignment within, different DMLM systems 210.

In another embodiment, alignment system 223 includes a third optical detector 254 rather than second optical detector 54. Third optical detector 254 is not configured to detect the position of fiducial marks 258 on build plate 212 through first scanning device 18. Rather, the observation perspective of third optical detector 254 is fixed relative to DMLM system 210.

Figure 5:
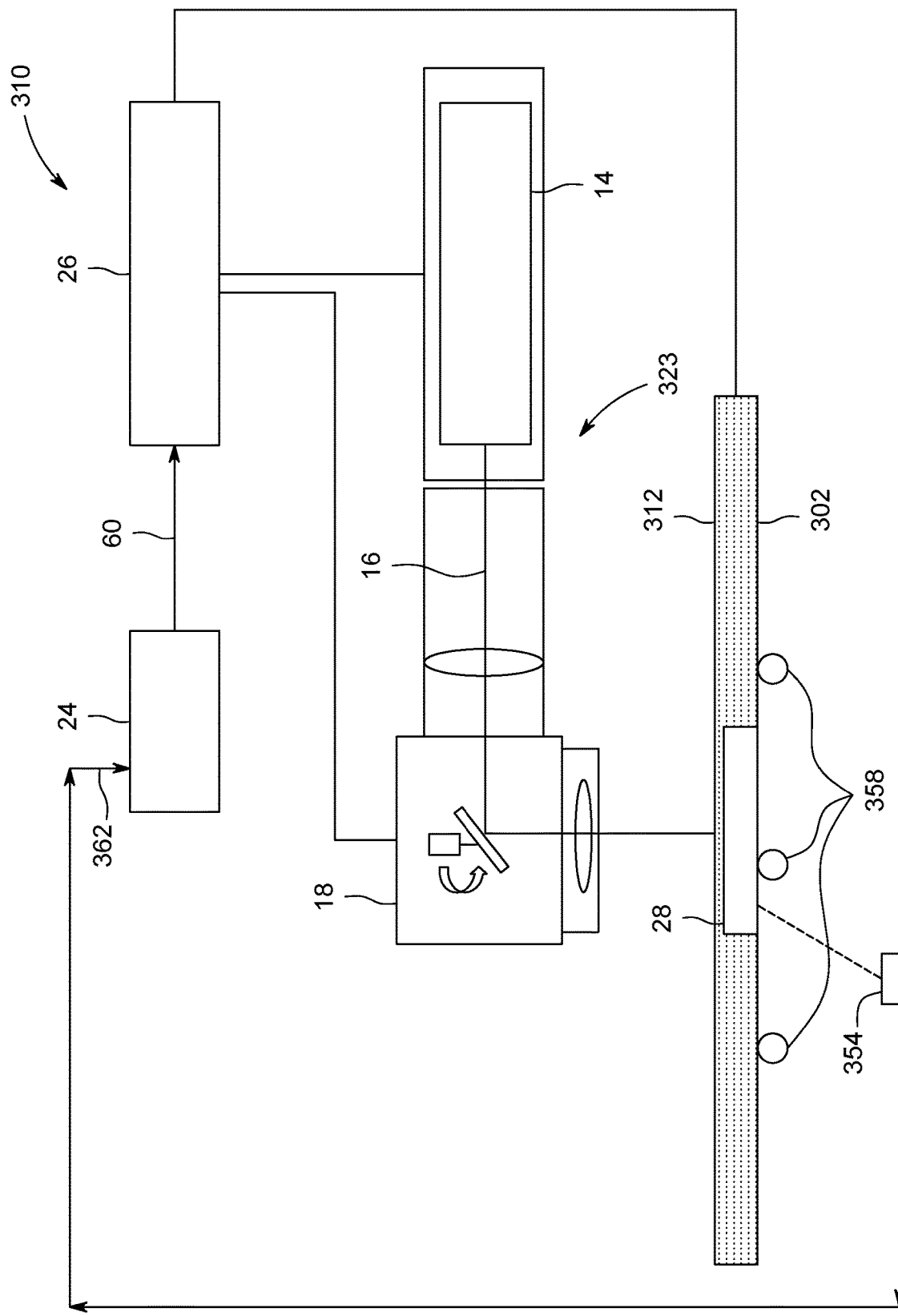
FIG. 5 is a schematic view of an exemplary additive manufacturing system shown in the form of a direct metal laser melting (DMLM) system including an alignment system.

FIG. 5 is a schematic view of an exemplary additive manufacturing system 310 with another embodiment of an alignment system 323 illustrated in the form of a direct metal laser melting (DMLM) system. Although the embodiments herein are described with reference to a DMLM system, this disclosure may also apply to other types of additive manufacturing systems, such as selective laser sintering systems. Common components between DMLM system 10 and DMLM system 310 have the same numbers. Unless otherwise indicated, components of DMLM system 310 are substantially similar to components of DMLM system 10 (shown in FIG. 1)

In the exemplary embodiment, DMLM system 310 includes a build plate 312, a laser device 14 configured to generate a laser beam 16, a first scanning device 18 configured to selectively direct laser beam 16 across build plate 312, and an alignment system 323. The exemplary DMLM system 310 also includes a computing device 24 and a controller 26 configured to control one or more components of DMLM system 310, as described in more detail herein.

Build plate 312 is configured to operate with multiple DMLM systems 310. In the exemplary embodiment, a first DMLM system 310 manufactures a first part of solid component 28 and a second DMLM system 310 manufactures a second part of solid component 28. Build plate 312 is moved from first DMLM system 310 to second DMLM system 310 with solid component 28 on build plate 312. Build plate 312 must be aligned with second DMLM system 310.

Alignment system 323 is configured to align build plate 312 with DMLM system 310. Alignment system 323 includes a second optical detector 354 and a plurality of fiducial marks 358 on a bottom side 302 of build plate 312. In the exemplary embodiment, build plate 312 includes three fiducial marks 358. However, build plate 312 may include any number of fiducial marks 358 which enable alignment system 323 to operate as described herein.

Figure 6:
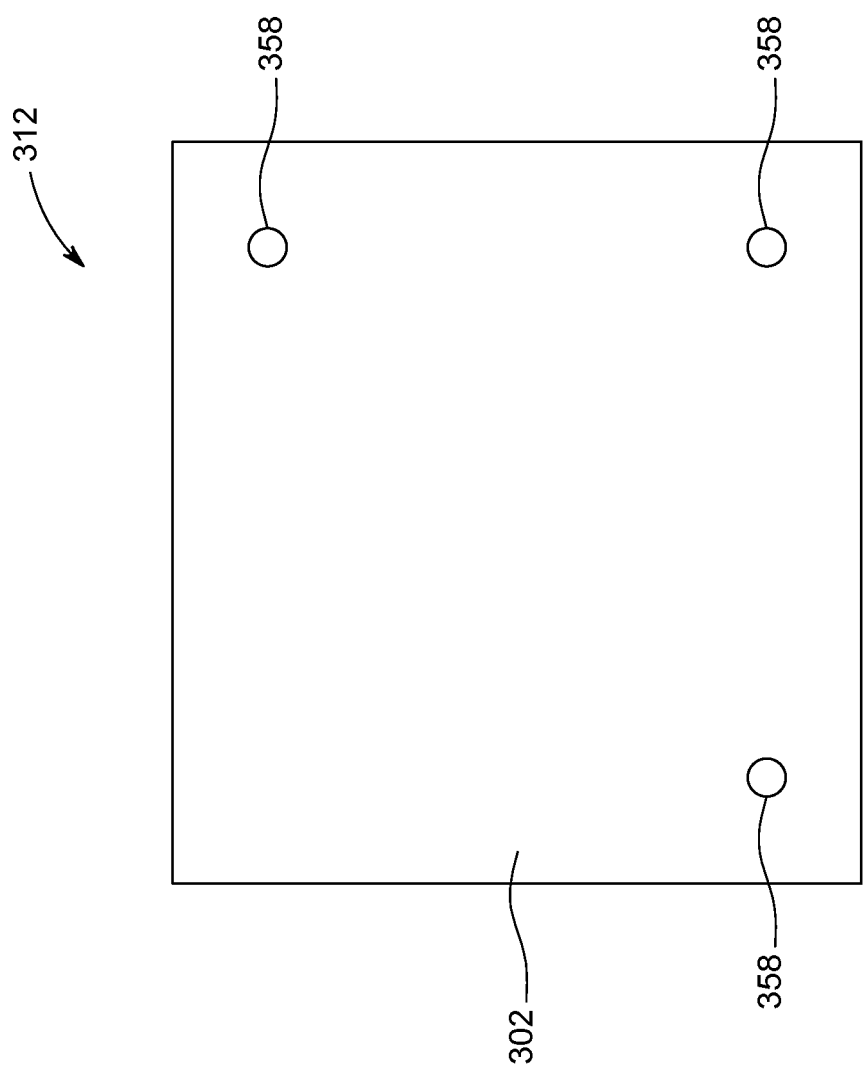
FIG. 6 is a schematic view of an build plate of the additive manufacturing system of FIG. 5.

FIG. 6 is a schematic view of bottom side 302 of build plate 312 of DMLM system 310. In the exemplary embodiment, build plate 312 has a rectangular shape. In other embodiments, build plate 312 may have any suitable size and shape that enables DMLM system 310 to function as described herein. Fiducial marks 358 are permanently coupled to bottom side 302 of build plate 312. In the exemplary embodiment, fiducial marks 358 have a sphere shape. In other embodiments, the shape of fiducial marks 358 may include a cross shape, a pyramid shape, or any shape which enables alignment system 323 to operate as described herein. Additionally, fiducial marks 358 may include a grid pattern, a pattern of dots, a checkerboard pattern, or any other pattern which enables alignment system 323 to operate as described herein.

As shown in FIG. 6, second optical detector 354 is located beneath build plate 312 and is configured to detect the position of fiducial marks 358 on bottom side 302 of build plate 312, and generate an electrical signal 362 in response thereto. Thus, second optical detector 354 detects the position of build plate 312 relative to DMLM system 310. Second optical detector 354 is communicatively coupled to computing device 24, and is configured to transmit electrical signal 362 to computing device 24. Computing device 24 generates a control signals 60 to controller 26 which controls the alignment of build plate 312 within DMLM system 310, the alignment of first scanning device 18, and alignment of mirror 34. Controller 26 aligns build plate in response to the position of fiducial marks 358 by changing the position of build plate 312, first scanning device 18, and mirror 34. Thus, build plate 312 is capable of moving to, and alignment within, different DMLM systems 310.

Figure 7:
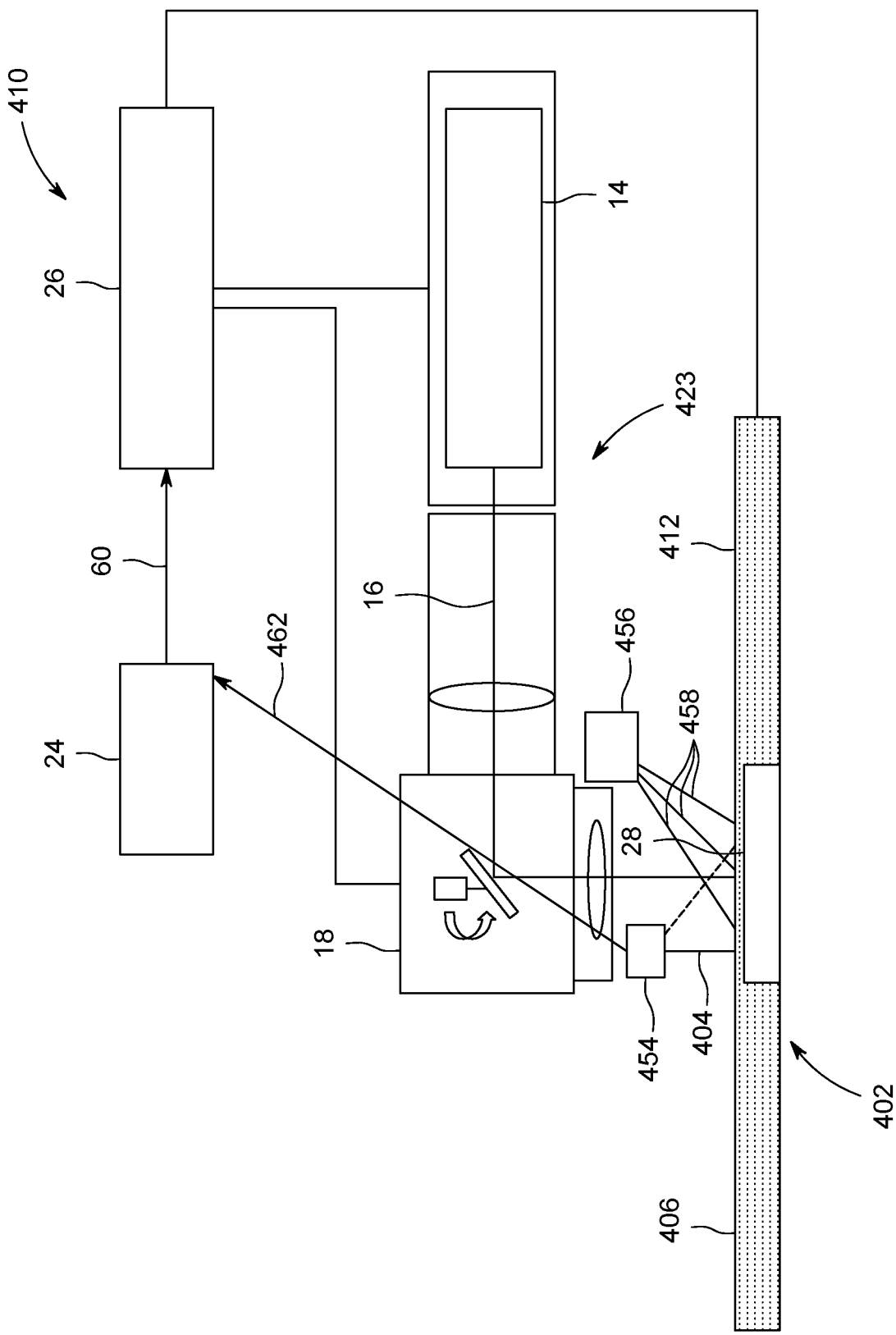
FIG. 7 is a schematic view of an exemplary additive manufacturing system shown in the form of a direct metal laser melting (DMLM) system including a mobile build plate unit and an alignment system.

FIG. 7 is a schematic view of an exemplary additive manufacturing system 410 with another embodiment of an alignment system 423 illustrated in the form of a direct metal laser melting (DMLM) system. Although the embodiments herein are described with reference to a DMLM system, this disclosure may also apply to other types of additive manufacturing systems, such as selective laser sintering systems. Common components between DMLM system 10 and DMLM system 410 have the same numbers. Unless otherwise indicated, components of DMLM system 410 are substantially similar to components of DMLM system 10 (shown in FIG. 1)

In the exemplary embodiment, DMLM system 410 includes a mobile build plate unit 402 including a build plate 412, a laser device 14 configured to generate a laser beam 16, a first scanning device 18 configured to selectively direct laser beam 16 across build plate 412, and an alignment system 423. The exemplary DMLM system 410 also includes a computing device 24 and a controller 26 configured to control one or more components of DMLM system 410, as described in more detail herein.

Mobile build plate unit 402 and Build plate 412 are configured to operate with multiple DMLM systems 410. In the exemplary embodiment, a first DMLM system 410 manufactures a first part of solid component 28 and a second DMLM system 410 manufactures a second part of solid component 28. Mobile build plate unit 402 and Build plate 412 are moved from first DMLM system 410 to second DMLM system 410 with solid component 28 on build plate 412. Build plate 412 must be aligned with second DMLM system 410.

Mobile build plate unit 402 includes a second optical detector 454 coupled to build plate 412 by a connector 404. Build plate 412 and second optical detector 454 are configured to move as a unit from DMLM systems 410 to other DMLM systems 410. Thus, the viewing area of second optical detector 454 is fixed relative to build plate 412.

Alignment system 423 is configured to align build plate 412 with DMLM system 410. Alignment system 423 includes a fiducial marks projector 456 configured to project a plurality of fiducial marks 358 on a top side 406 of build plate 412. Fiducial marks projector 456 is coupled to DMLM system 410. Thus, the position of fiducial marks 458 is fixed relative to DMLM system 410. In the exemplary embodiment, fiducial marks projector 456 projects three fiducial marks 358. However, fiducial marks projector 456 may project any number of fiducial marks 358 which enables alignment system 423 to operate as described herein.

Figure 8:
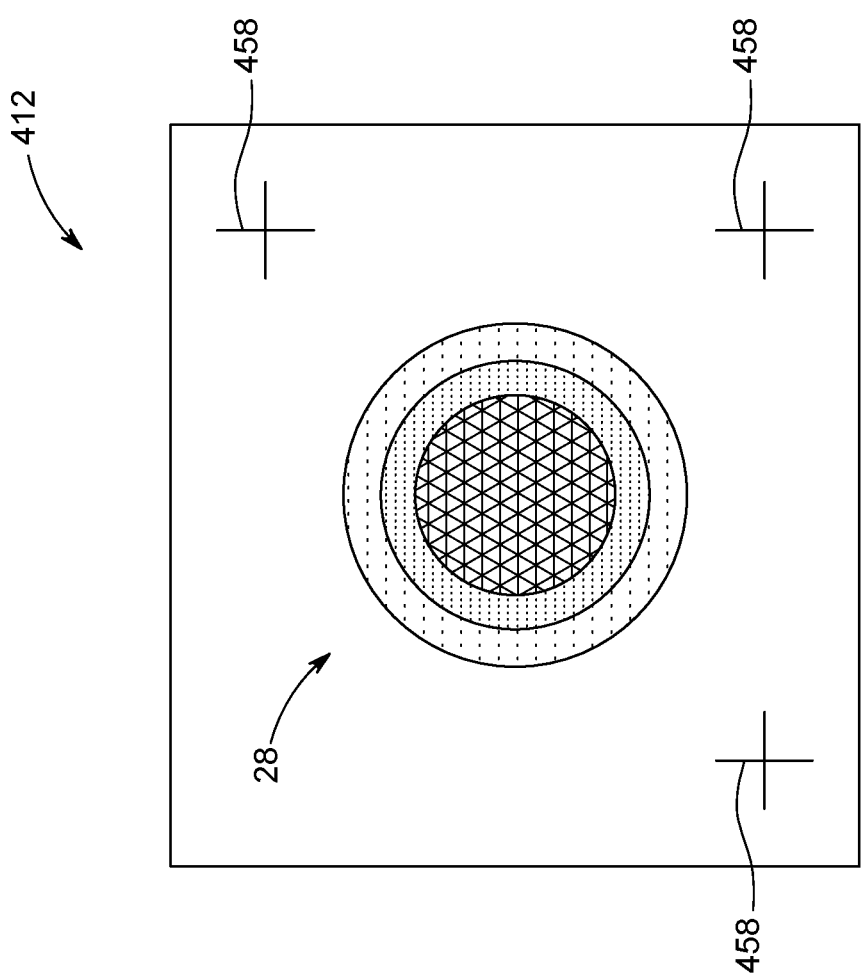
FIG. 8 is a schematic view of an build plate of the additive manufacturing system of FIG. 7.

FIG. 8 is a schematic view of top side 406 of build plate 412 of mobile build plate unit 402. In the exemplary embodiment, build plate 412 has a rectangular shape. In other embodiments, build plate 412 may have any suitable size and shape that enables DMLM system 410 to function as described herein. Fiducial marks 458 are project onto top side 406 of build plate 412. In the exemplary embodiment, fiducial marks 458 have a cross shape. In other embodiments, the shape of fiducial marks 458 may include a circle shape, a triangle shape, or any shape which enables alignment system 423 to operate as described herein. Additionally, fiducial marks 458 may include a grid pattern, a pattern of dots, a checkerboard pattern, or any other pattern which enables alignment system 423 to operate as described herein.

As shown in FIG. 7, second optical detector 454 is located above build plate 412 and is configured to detect the position of fiducial marks 458 on top side 406 of build plate 412, and generate an electrical signal 462 in response thereto. Thus, second optical detector 454 detects the position of build plate 412 relative to DMLM system 410. Second optical detector 454 is communicatively coupled to computing device 24, and is configured to transmit electrical signal 462 to computing device 24. Computing device 24 generates a control signals 60 to controller 26 which controls the alignment of build plate 412 within DMLM system 410, the alignment of first scanning device 18, and alignment of mirror 34. Controller 26 aligns build plate in response to the position of fiducial marks 458 by changing the position of build plate 412, first scanning device 18, and mirror 34. Thus, build plate 412 is capable of moving to, and alignment within, different DMLM systems 410.

In another embodiment, alignment system 423 does not include fiducial marks projector 456. Rather, second optical detector 454 detects the position of laser beam 16 on top side 406 of build plate 412 and alignment system 423 aligns build plate 412 based on the position of laser beam 16. In another embodiment, alignment system 423 does not include fiducial marks projector 456 and does not project any kind of fiducial mark onto build plate 412. Rather, DMLM system 410 builds a fiducial mark onto top side 406 of build plate 412 and second optical detector 454 detects the position of the built fiducial mark on top side 406 of build plate 412. Alignment system 423 aligns build plate 412 based on the position of the built fiducial mark. In yet another embodiment, detectors 454 (e g cameras or position sensitive detectors) are placed on build plate 412 within the scan field area of the scanner 18. Detectors 454 are configured to directly capture laser beam 16 and generate signals corresponding to position of the beam on the detector (and enabling calculation of the deviation of that position from nominal).

Embodiments of the additive manufacturing systems with an alignment system described herein align a build plate with a direct metal laser melting (DMLM) system. The additive manufacturing system includes an alignment system including an optical detector and a plurality of fiducial marks on the build plate. In one embodiment, the fiducial marks are projected onto the build plate and the optical detector observers the fiducial marks coincident with the laser beam through a galvanometer. In another embodiment, the fiducial marks are coupled to the top of the build plate and the optical detector observers the fiducial marks independent of the laser beam. In yet another embodiment, the fiducial marks are coupled to the bottom of the build plate and the optical detector observers the fiducial marks from below the build plate. In yet another embodiment, the fiducial marks are projected onto the build plate and the optical detector is permanently coupled to the build plate. During operations, the build plate is moved to multiple DMLM systems during the course of building a single component. The optical detector observes the fiducial marks on the build plate and detects the position of the build plate relative to the DMLM system. The alignment system within each DMLM system aligns the build plate with the DMLM system based on the position of the build plate. Aligning the build plate with different DMLM systems allows the component to be built on multiple DMLM systems, decreasing build time.

An exemplary technical effect of the methods and systems described herein includes: (a) projecting a plurality of fiducial marks on a build plate; (b) detecting the position of the fiducial marks on the build plate; (c) aligning the build plate with a DMLM system; (d) moving a build plate to multiple DMLM systems; and (e) decreasing the build time of a component.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of additive manufacturing systems having an alignment system are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with additive manufacturing systems as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system comprising:
a laser device configured to generate a laser beam;
a build plate having a position relative to said laser device;
a first scanning device configured to selectively direct the laser beam across said build plate, wherein the laser beam generates a melt pool on said build plate; and
an alignment system comprising:
  a fiducial marks projector configured to project a plurality of fiducial marks across said build plate, each fiducial mark having a location on said build plate, wherein said fiducial marks projector is configured to adjust at least one of a size and a shape of said plurality of fiducial marks; and
  an optical detector configured to detect said location of each of said fiducial marks on said build plate, wherein said alignment system is configured to detect said position of said build plate relative to said laser device.

2. The additive manufacturing system in accordance with claim 1 further comprising a controller configured to align said build plate with said laser device based on said detected location of said fiducial marks.

3. The additive manufacturing system in accordance with claim 2, wherein said controller configured to align said build plate with said first scanning device.

4. The additive manufacturing system in accordance with claim 2, wherein said first scanning device comprises a plurality of mirrors configured to direct the laser beam across a build plate, said controller further configured to align said plurality of mirrors with said build plate.

5. The additive manufacturing system in accordance with claim 1, wherein said fiducial marks projector comprises a plurality of lasers configured to project said plurality of fiducial marks across said build plate.

6. An additive manufacturing system comprising:
a laser device configured to generate a laser beam;
a build plate having a position relative to said laser device, said build plate comprising a plurality of fiducial marks disposed on a top side of said build plate, each fiducial mark having a location on said build plate;
a first scanning device configured to selectively direct the laser beam across said build plate, wherein the laser beam generates a melt pool on said build plate;
an alignment system comprising an optical detector configured to detect said location of each of said fiducial marks on said build plate, wherein said alignment system is configured to detect said position of said build plate relative to said laser device; and
a controller configured to align said build plate with said laser device by changing a position of said build plate based on said detected location of said fiducial marks.

7. The additive manufacturing system in accordance with claim 6, wherein said controller configured to align said build plate with said first scanning device.

8. The additive manufacturing system in accordance with claim 6, wherein said first scanning device comprises a plurality of mirrors configured to direct the laser beam across a build plate, said controller further configured to align said plurality of mirrors with said build plate.

9. The additive manufacturing system in accordance with claim 6, wherein said plurality of fiducial marks comprises a plurality of spheres disposed on said top side of said build plate.

10. An additive manufacturing system comprising:
a laser device configured to generate a laser beam;
a build plate having a position relative to said laser device, said build plate comprising a plurality of fiducial marks disposed on a bottom side of said build plate, each fiducial mark having a location on said build plate;
a first scanning device configured to selectively direct the laser beam across said build plate, wherein the laser beam generates a melt pool on said build plate;
an alignment system comprising an optical detector configured to detect said location of each of said fiducial marks on said build plate, wherein said alignment system is configured to detect said position of said build plate relative to said laser device; and
a controller configured to align said build plate with said laser device by changing a position of said build plate based on said detected location of said fiducial marks.

11. The additive manufacturing system in accordance with claim 10, wherein said controller configured to align said build plate with said first scanning device.

12. The additive manufacturing system in accordance with claim 10, wherein said first scanning device comprises a plurality of mirrors configured to direct the laser beam across a build plate, said controller further configured to align said plurality of mirrors with said build plate.

13. The additive manufacturing system in accordance with claim 10, wherein said plurality of fiducial marks comprises a plurality of spheres disposed on said bottom side of said build plate.

14. An additive manufacturing system comprising:
a laser device configured to generate a laser beam;
a mobile build plate unit comprising a build plate and an optical detector, said build plate having a position relative to said laser device;
a first scanning device configured to selectively direct the laser beam across said build plate, wherein the laser beam generates a melt pool on said build plate; and
an alignment system comprising a fiducial marks projector configured to project a plurality of fiducial marks across said build plate, each fiducial mark having a location on said build plate, said optical detector configured to detect said location of each of said fiducial marks on said build plate, wherein said alignment system is configured to detect said position of said build plate relative to said laser device, and wherein said fiducial marks projector is configured to adjust at least one of a size and a shape of said plurality of fiducial marks; and
a controller configured to align said build plate with said laser device by changing a position of said build plate.

15. The additive manufacturing system in accordance with claim 14 further comprising a controller configured to align said build plate with said laser device based on said detected location of said fiducial marks.

16. The additive manufacturing system in accordance with claim 15, wherein said controller configured to align said build plate with said first scanning device.

17. The additive manufacturing system in accordance with claim 16, wherein said first scanning device comprises a plurality of mirrors configured to direct the laser beam across a build plate, said controller further configured to align said plurality of mirrors with said build plate.

18. The additive manufacturing system in accordance with claim 14, wherein said fiducial marks projector comprises a plurality of lasers configured to project said plurality of fiducial marks across said build plate.

* * * * *